United States Patent
Zimprich (10) Patent No.: US 7,197,808 B2
(45) Date of Patent: Apr. 3, 2007

(54) PROCESS FOR FORMING A GROOVE IN A FRICTION LAYER

(75) Inventor: Dieter Zimprich, Eppelheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/281,746

(22) Filed: Oct. 28, 2002

(65) Prior Publication Data
US 2004/0078952 A1   Apr. 29, 2004

(51) Int. Cl.
*B23P 25/00* (2006.01)
(52) U.S. Cl. ............................................. 29/458; 72/98
(58) Field of Classification Search ................. 29/458, 29/DIG. 32; 72/98; 192/107 R; 188/218 XL; 492/1, 16, 38, 39, 46; 198/107 R
See application file for complete search history.

(56) References Cited

U.S. PATENT DOCUMENTS

| | | | |
|---|---|---|---|
| 1,150,805 A * | 8/1915 | Beran ........................... | 72/478 |
| 2,689,493 A | 9/1954 | Bedker | |
| 3,073,424 A | 1/1963 | Russell | |
| 3,712,099 A | 1/1973 | Elsbett et al. | |
| 3,750,444 A * | 8/1973 | Bittner ........................... | 72/78 |
| 4,299,106 A * | 11/1981 | Hague ........................... | 72/78 |
| 4,385,429 A | 5/1983 | Crankshaw | |
| 4,426,868 A * | 1/1984 | Torniainen ........................... | 72/98 |
| 4,616,391 A * | 10/1986 | Cunningham et al. .......... | 72/98 |
| 4,692,978 A * | 9/1987 | Cunningham et al. . | 29/890.048 |
| 4,915,166 A * | 4/1990 | Cunningham et al. ...... | 165/184 |
| 5,101,953 A | 4/1992 | Payvar | |
| 5,292,298 A * | 3/1994 | Scannell ....................... | 492/46 |
| 5,295,278 A * | 3/1994 | Condon et al. ........... | 15/104.04 |
| 5,483,812 A * | 1/1996 | Dempsey .................... | 72/252.5 |
| 5,517,710 A * | 5/1996 | Hisey ........................... | 15/106 |
| 6,067,832 A * | 5/2000 | Brand et al. .................... | 72/98 |
| 6,318,534 B1 | 11/2001 | Zimprich | |
| 6,370,755 B1 * | 4/2002 | Wakamori .................... | 29/412 |

FOREIGN PATENT DOCUMENTS

| | | |
|---|---|---|
| CH | 265 584 A | 12/1949 |
| FR | 2 523 010 A | 9/1983 |
| JP | 63 084740 A | 5/1988 |

OTHER PUBLICATIONS

European Search Report for Appl. No. EP 01 12 4913 relating to this U.S. application.

* cited by examiner

*Primary Examiner*—Jermie E. Cozart
(74) *Attorney, Agent, or Firm*—Emch, Schaffer, Schaub & Porcello, Co., L.P.A.; Greg Dziegielewski (57) ABSTRACT

Device for forming of at least one groove (92, 93, 94, 95, 96, 97, 98) in a friction layer (91) of a covered disk (90) for a force transmission aggregate, in particular for a disk clutch, with a rolling device (1, 11, 21, 31) with at least one roller flange (7, 17, 27a . . . 27f, 37a . . . 37c) for rolling in the at least one groove (92, 93, 94, 95, 96, 97, 98).

1 Claim, 6 Drawing Sheets

PROCESS FOR FORMING A GROOVE IN A FRICTION LAYER

BACKGROUND OF THE INVENTION

The invention concerns a device for forming at least one groove in a friction layer of a covered plate for a force transmission aggregate, in particular for a clutch disk, as well as a process for forming at least one groove in a friction layer of a friction plate for a force transmission aggregate, in particular for a clutch disk.

Disk clutches generally include a plurality of disks, which can be produced using the device described below or, as the case may be, using the process described below. Conventionally a first group of disks of this type is provided upon a disk carrier fixed against rotation and sliding, and a second group is provided drivable upon a drive hub. The disks of the two groups intermesh or interdigitate in each other in the manner of gear teeth. The two groups are slideable relative to each other in the axial direction and thereby can be brought pair-wise into or out of engagement. A disk clutch of the above-described type is described, for example, in DE 199 06 980 A1.

The individual disks are preferably formed ring-shaped. Distinctions are made between so-called covered disks and so-called steel disks. Covered disks are in general constructed in sandwich-like manner. The base element for a ring-shaped covered disk of this type is a ring carrier, which is comprised for example of steel and is produced preferably by stamping. This sheet metal carrier carries a friction layer on one or both of its ring surfaces. This layer is comprised in general of a fibrous material, such as paper, or is produced from a paper-like material.

There are however also disk clutches or disk brakes, in which the disk is continuous, that is, is produced as a unitary piece of a friction material.

In the above-mentioned force transmission aggregate, the lubrication and cooling of the individual construction components plays an essential role. For this reason a lubricant, preferably oil, is provided between the individual disks. In order to hold the lubricating oil for a predetermined period on the friction surfaces of the disks or, as the case may be, to be able to release oil, the above-mentioned layer exhibits a sponge-like structure. In the non-pressured condition, that is, when there is no contact between adjacent disks, a certain amount of oil storage is taking place, which is again given off or released during actuation and the compression occurring in conjunction therewith. Since the sponge-like structure of the friction layer is however not adequate by itself to ensure that the functional requirements of the force transmission aggregate will be satisfied, it is within the state of the art to introduce grooves into the friction layer of the disk. Depending upon the intended employment of the respective force transmission aggregates, the grooves can be designed or formed in the most diverse design and manner. Depending upon the function to be fulfilled, these grooves can be in the form of rays, lines, curves, criss-cross and the like. Further, the most diverse groove cross-sectional shapes and sizes can be utilized.

According to the state of the art, processes are employed for producing among other things of the above-described grooves, in which the friction layer is removed to define the groove contour.

A material removing process step of this type has been found to be disadvantageous in many respects. In particular, it is not possible, in accordance with this process to apply the friction layer upon the carrier material and to introduce the grooves in a single process step. A continuous manufacturing process is thus not possible. Besides this, this type of material removing process exhibits the disadvantage, that the removed material disperses and soils the disk pre-form or the machine or machine parts.

From the state of the art it is further known to introduce the grooves by a press or stamping process. This is however associated with the disadvantage that the necessary groove depth cannot be achieved, or can be achieved only with great difficulty.

The invention is thus concerned with the task of providing a device or, as the case may be, a process for introduction of grooves into a friction layer of a covered disk, with which, or as the case may be, in which the above described problems no longer occur. In particular, a continuous manufacturing process should be made possible with high speed. The transfer as well as the manipulation of work pieces should occur in simple manner, and contamination should be substantially eliminated. Beyond this, in accordance with the device or, as the case may be, the process, in particular on the basis of the elimination of the above mentioned disadvantages, a cost reduction is achieved.

The task is inventively solved by a device or, as the case may be, a process for introduction of at least one groove in a friction layer of a friction disk or a force transmission aggregate, in particular for a disk clutch, with the features of the characterizing portion of the claims.

Advantageous embodiments and further developments of the invention are set forth in the dependent claims.

The inventive process is based on the idea, that the at least one groove is introduced by a rolling or turning process. Accordingly, the device includes a rolling device with at least one rolling arm for rolling the at least one groove.

During the rolling process the disk is moved under the corresponding rolling device or the rolling device is moved over the disk.

A process of this type can be integrated in simple manner into a continuous manufacturing process. The invention in particular envisions that the one or more grooves are introduced immediately subsequent to the process of gluing or lamination of the friction layer to the carrier material. It has been found that the introduction of the groove via the rolling process is to be carried out at elevated temperature, in order to produce high value grooves. Since the process of gluing the friction layer to the carrier material usually occurs at elevated temperature, the above described rolling process is preferably incorporated into the existing production process. It has further been found that a process of this type is suitable both for the introduction of grooves into a disk provided on one side with a friction layer, as well as for introduction into disks provided on both sides with a frictional layer.

In the following a description will be provided as to the mode and manner in which the inventive device can be constructed in advantageous manner. A first particularly advantageous embodiment of the invention envisions that the rolling device includes a drive shaft rotatable about a rotation axis, co-axially upon which is provided at least one essentially circular shaped template disk, the disk defined by an outer diameter and an outer circumference or outer contour. The at least one rolling arm is thus formed by the outer circumference of the at least one circular shaped template disk. For almost any conceivable groove design to be introduced into a disk, there can be produced in this manner in the shortest possible time a device for introduction of the groove in the friction layer, in which simply one or more template disks are appropriately provided upon the drive shaft. A set of disks of this type is easy to change out.

In order to be able to introduce grooves in various separations in the friction layer of the respective covered disks, it is envisioned in accordance with the invention, that template disks provided side-by-side or adjacent to each other are spaced apart with the aid of appropriate spacer rings of, in certain cases, varying thicknesses. A device of this type is simple in design and manufacture, and therewith is economical. Further, the template disks as well as the spacer rings are easily manufactured and therewith also economical.

As has already been described in detail, depending upon the intended use it may be necessary to introduce the grooves into the friction layer with varying groove depths. This also is easily accomplished in the present described rolling device using one or more template disk set spaced apart by spacer rings in simple manner. Essentially, template disks with (in certain cases, small amount) varying diameters are seated upon the drive shaft.

With the aid of a device described herein comprising template disks and spacer rings, it is possible to introduce grooves in a friction layer, which preferably extend essentially linearly. The manufacture of curved grooves is only possible to a limited extent when using this device, since the circumference of the template disks must exhibit a corresponding curvature. However, in accordance with one variant of the presently described embodiment, groove designs can be produced in simple manner with crisscrossing grooves formed of essentially linearly groove tracks, in which the respective disk passes multiple times through the rolling process, however relative to the preceding process step is rotated by a certain angular amount with respect to the rolling device.

Almost any conceivable groove pattern or design can be achieved with a rolling device of the following described embodiment: In this embodiment the rolling device includes a drum rotatable about a rotation axis with an outer circumference surface, upon which again one rolling flange or multiple rolling flanges are provided. Since a drum of this type, in contrast to the above-described rolling disk, extends in the axial direction, rolling flanges can be provided and arranged in any type and manner. In particular, rolling flanges are possible which extend only partially in the axial direction, or which extend in any other mode and manner, even extending slanted or even curved.

In the simplest case, the outer circumference surface is formed as a cylinder. The introduction of the grooves corresponds then substantially to the above described embodiment. It is however essentially also possible, that the outer circumference surface is formed by the side surfaces of a cylinder with a multi-sided base shape.

It is further envisioned in accordance with the invention that the corresponding rolling flange cross-sections are of various design. In particular, the corresponding cross sections can be of semicircular design, triangular design, trapezoidal design or a right-angled design, depending upon the cross-section of the groove to be produced. It is readily apparent that the cross sectional shape of the rolling flanges in both of the above described rolling devices can be varied.

As already described in detail in the preceding sections, it is advantageous to form the grooves in the friction layer at elevated temperatures. For this reason the invention envisions the provision of a heating device for heating the rolling flanges.

It has further been found to be advantageous to provide a cleaning device for cleaning the rolling device and/or the rolling flanges, even though the presently described inventive process is not a material removing process.

Four illustrative embodiments are shown in the figures and are described in greater detail in the following.

SUMMARY OF THE INVENTION

The present invention is directed to a device for introducing at least one groove into a friction layer of a covered disk for a force transmission aggregate. In certain embodiments, the force transmission aggregate preferably comprises a disk clutch. The device comprises a rolling device with at least one roller flange for roller forming at least one groove therein.

In certain aspects, the rolling device includes a drive shaft rotatable about a rotation axis, upon which at least one template disk is provided coaxially. The outer circumference of the template disks forms at least one roller flange. In certain embodiments, multiple template disks are provided upon the drive shaft next to each other with a desired axial separation. In certain embodiments, the spacer disks are provided between the template disks. Further, in certain aspects, the template disks can have different diameters and/or, the spacer rings can have different thicknesses.

In yet another aspect of the present invention, the device comprises the roller disk which includes a drum rotatable about a rotation axis with a circumference upon which the at least one roller flange is provided. In certain embodiments, the circumference surface is cylindrical. Further, according to certain embodiments, the roller flanges are oriented or slanted with respect to the axial direction.

In certain further embodiments of the present invention, the roller flanges can have different cross-sectional shapes. In particular, the roller flange outer edge cross-section can have the form of a semi-circle, a triangle, a trapezoid, and/or a right angle.

Still further embodiments of the present invention provide a heating device for heating at least one of the roller devices or roller flanges.

Yet further embodiments of the present invention include a device having a cleaning device for cleaning at least one of the roller devices or roller flanges.

In a still further aspect of the present invention, a process is provided for introducing at least one groove into a friction layer of a friction disk for a force transmission aggregate which includes roller forming at least one groove in the friction disk. In certain embodiments, the at least one groove is roller formed immediately after a step of gluing the friction layer to a carrier material.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
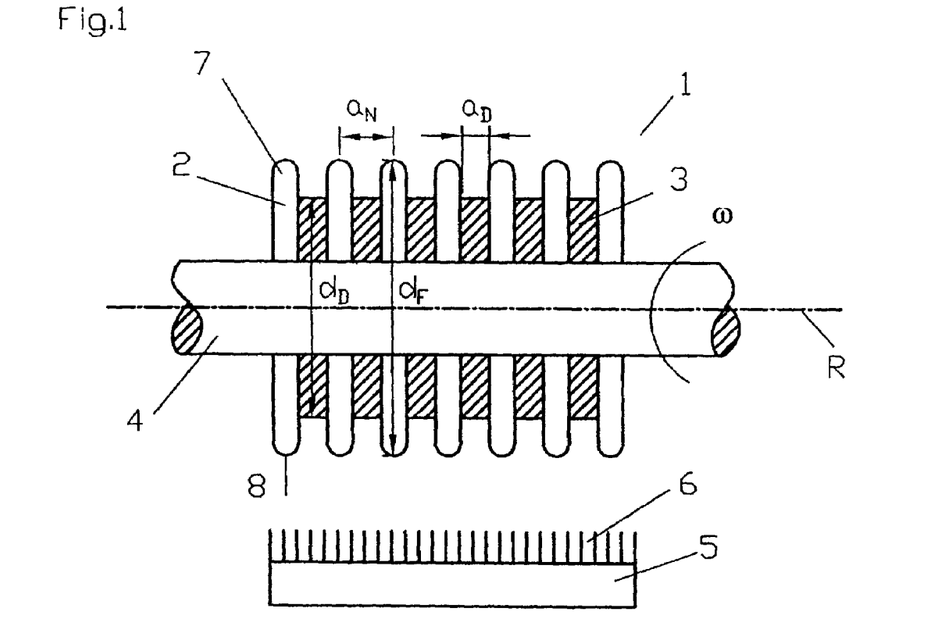
FIG. 1 an axial segment of a first inventive embodiment of an inventive device for introduction of grooves in a friction layer of a friction disk for a force transmission aggregate, in particular for a disk clutch.

The first illustrative embodiment of a rolling device 1, shown in FIG. 1, is based upon a drive shaft 4 mounted rotatably about a rotation axis R (rotation direction ω). Seated upon this drive shaft 4 are arranged, coaxially, a total of seven template disk rings 2. The individual template disk rings 2 are spaced apart via intermediate spacer rings 3 arranged co-axially in same manner. The total disk set is comprised of template disks 2 and spacer rings 3 which are essentially rigidly connected with the drive shaft 4 with the aid of—here not shown—fixing devices. A fixing device of this kind can be of a design for example such that the outer template disk 2 is screwed onto the drive shaft 4. A rotation in the circumferential direction can be prevented for example thereby, that the template disk 2 and in certain cases also the spacer rings 3 have an internal teething and the drive shaft 4 exhibits an external teething, which engage in each other.

For a person of ordinary skill it is readily apparent that the outer diameter $d_F$ of the template disks 2 is larger than the outer diameter $d_D$ of the spacer rings 3. The thickness $a_D$ of the spacer rings 3 provides the separation $a_N$ of the template disks 2.

It can further be seen from FIG. 1 that the template disks 2 are curved arc-like at their outer circumference 8. Since the outer circumference of the respective template disks 2 represent the respective rolling flanges 7 for rolling in of the groove, it can be seen that the groove to be introduced is to exhibit a semicircular bow-shaped cross sectional design.

For introducing the grooves in the friction layer of a friction disk the rolling device 1 represented in FIG. 1 is moved over the covered disk under a pre-tensioned force (pressure) or, as the case may be, in the converse the covered disk may be guided correspondingly under the rolling device 1. It is to be noted that the needed pre-tension amount depends upon the type and thickness of the friction layer as well as the type and the cross section of the groove to be introduced. Further care is to be taken that the friction layer is not already hardened or cured. It has been found particularly advantageous to carry out the turning process immediately subsequent to the process of gluing or lamination of the friction layer with the carrier material.

It has further been found to be of advantage to provide a cleaning device for cleaning the rolling device 1 and in particular the rolling flanges 7. This cleaning device 5 can in the present case be designed as a brush device 6. Rinsing or vacuum devices (with gaseous or liquid medium) are likewise conceivable.

Figure 2:
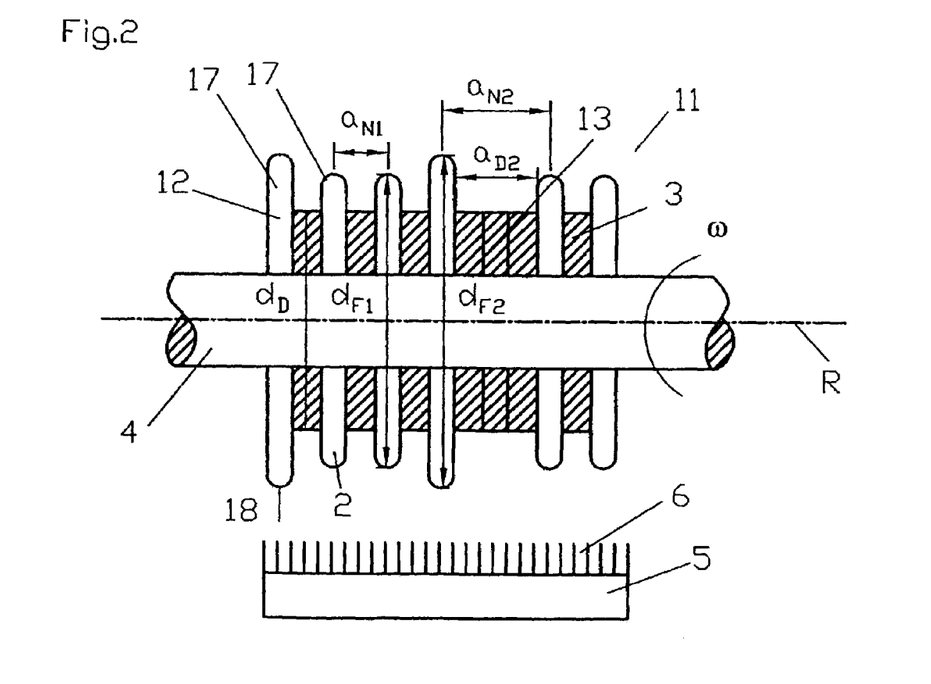
FIG. 2 an axial segment of a second inventive embodiment of an inventive device for introduction of grooves of various depths and in various spacings from each other in the friction layer of a covered disk for a force transmission aggregate, in particular for a disk clutch.

The illustrative embodiment represented in FIG. 2 shows a further development of the present described illustrative embodiment according to FIG. 1. The rolling device 11 is comprised, as in the above-described illustrative embodiment of a drive shaft 4 rotatable (ω) about a rotation axis R with co-axially arranged circular-shaped template disks 2, 12 and spacer rings 3, 13. As in the above-described case the rolling flange cross section 17 has a semicircular arc shaped form at the circumference 18 of the respective template disks 2, 12. Similarly, analogous to the above-described illustrative embodiment, a cleaning device 5 with brushes 6 is provided.

The presently described illustrative embodiment differs with respect to the previously described example essentially thereby, that the spacer rings 3, 13 exhibit varying thicknesses. The corresponding dimensions or measurements are indicated in the drawing with the reference symbol $a_D$, or, as the case may be, $a_{D2}$. A further departure from the previously described example is comprised therein, that the diameters of the circular shaped template disks 2, 12 also differ. Four of the circular shaped template disks 2 exhibit a diameter $d_{F1}$, two template disks 12 exhibit diameter $d_{F2}$. This illustrative embodiment shows that, in a working step, grooves of different depths and with varying spacings to each other can be introduced into the friction layer.

Figure 3:
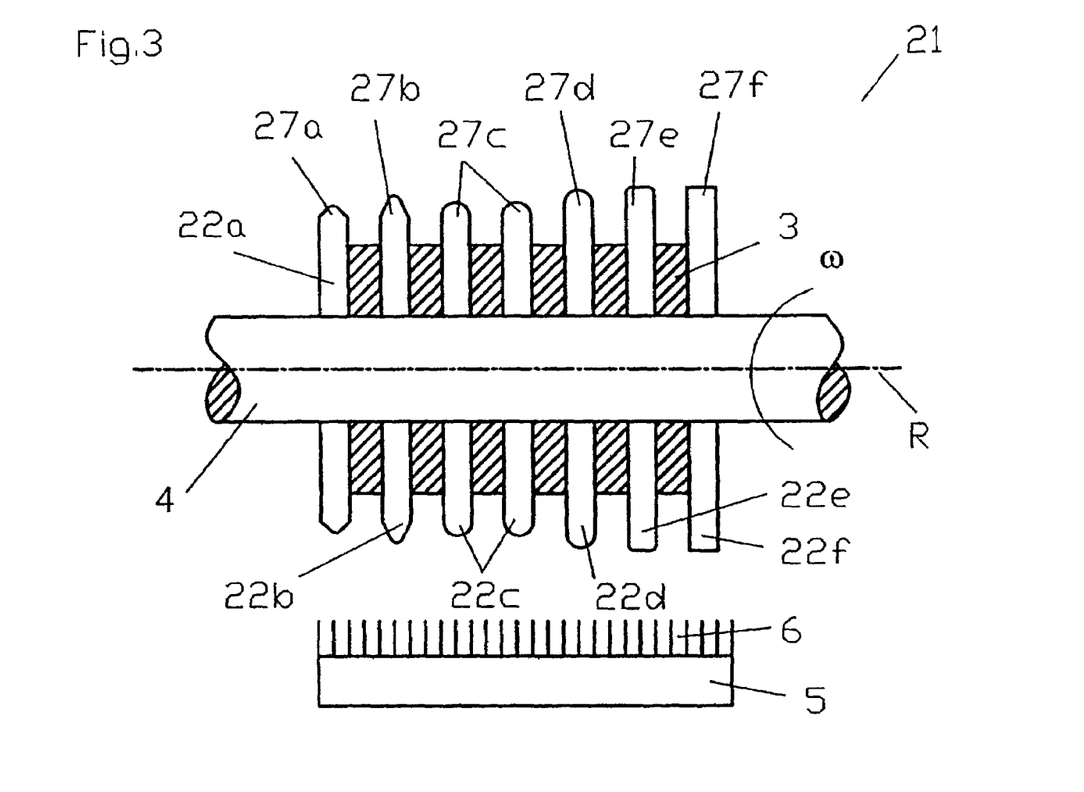
FIG. 3 an axial segment of a third inventive embodiment of an inventive device for introduction of grooves of various cross section geometry in the friction layer of a covered disk for a force transmission aggregate, in particular for a disk clutch.

From FIG. 3 it can be seen that not only can grooves of different spacing and depths be introduced in a friction layer with the inventive device, but rather also those with diverse cross sectional geometry. The rolling device 21 shown in FIG. 3 is based, as in the above-described examples, upon a drive shaft 4 mounted rotatably (ω) about a rotation axis R with a plurality of circular ring shaped template disks 22a, 22b, 22c, 22d, 22e and 22f, which again are spaced apart by means of appropriate spacer rings 3, and seated co-axial upon the drive shaft 4. From the representation according to FIG. 3 one can further see rolling flanges with diverse designs of cross sections in the area of the outer circumference of the respective template disks 22a ... 22f. Two of the rolling flange cross sections exhibit, as in the above-described example, a semicircular arc shaped design 27c, two further exhibit a triangular shape 27a and 27b, two further exhibit trapezoid shaped design 27d, 27e and a last one exhibits a right-angled or squared-off design 27f.

Figure 4:
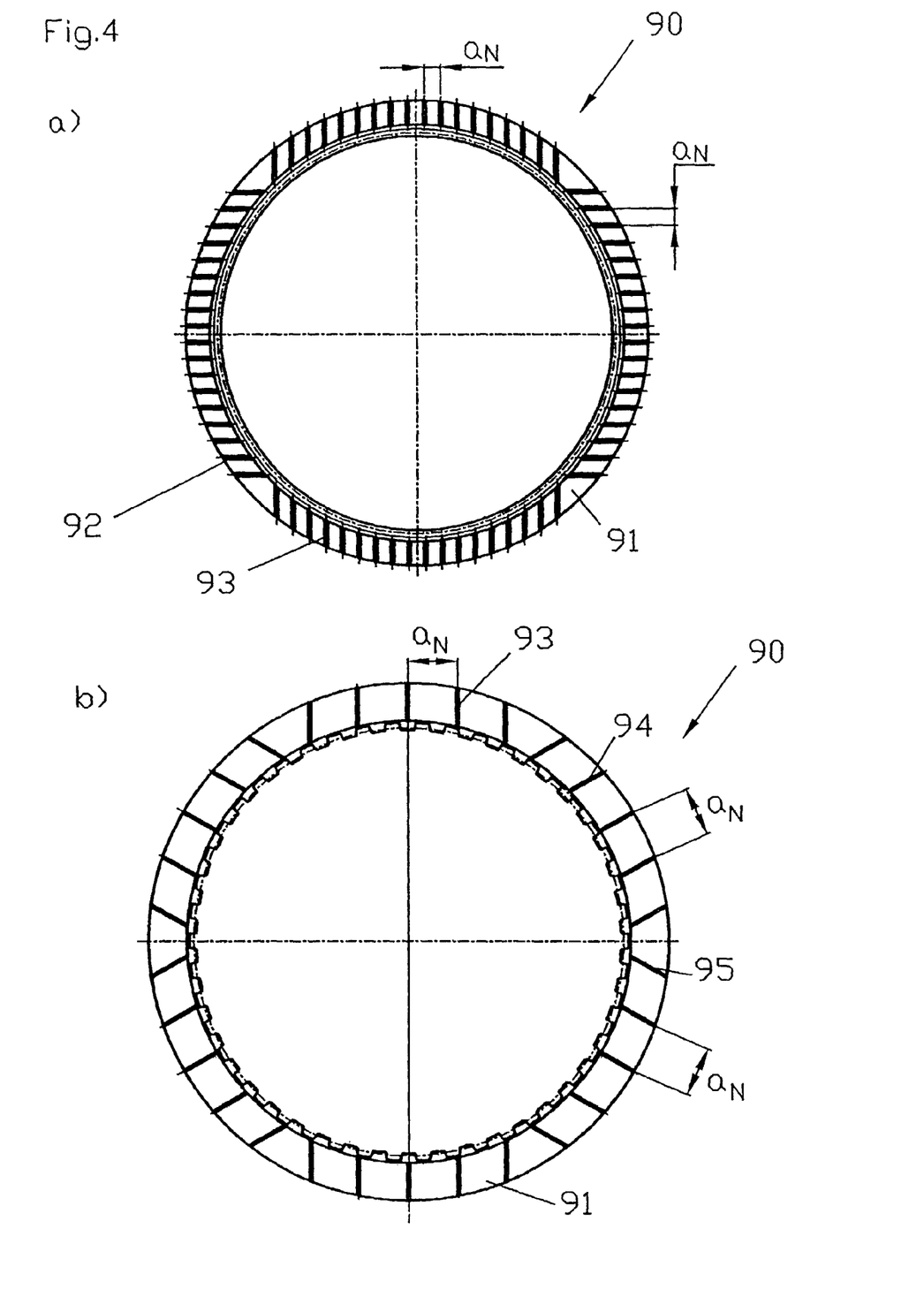
FIG. 4 a top view upon diverse covered disks with grooves for a disk clutch
   groove images of grooves, which can be produced with the aid of one or more of the devices according to FIGS. 1 through 3
      a) cross shaped groove image
      b) ray shaped groove image
      c) waffle groove image
      d) square or diamond image FIG. 5 a perspective view a fourth illustrative embodiment of an inventive device for introduction of non-linear grooves in a friction layer of a covered disk for a force transmission aggregate, in particular for a disk clutch.

FIG. 4 illustrates, on the basis of representations of top views upon the friction disks with grooves, the types of groove patterns that can be produced with the aid of one or more of the previously described devices according to FIG. 1 through 3. FIG. 4a) shows a groove image or pattern in which seven grooves are provided running linearly next to each other. Seven similarly arranged grooves 92 cross the above-described group of grooves 93 at an angle of about 90°. The separation of the respective grooves is indicated in the figure by the reference symbol $a_N$.

FIG. 4b) shows a groove pattern in a friction layer 91 of a friction disk 90 in which three groups of grooves 93, 94 and 95 (individual grooves with spacing $a_N$) are oriented concentrically, offset at an angle of 60° relative to each other.

FIG. 4c) shows a so-called waffle groove pattern, in which two groups of grooves 92 and 93 (here the individual grooves of the respective groups) run crossing at right angles with a separation of $a_{N1}$ or, as the case may be, $a_{N2}$.

FIG. 4d) shows a groove pattern changed slightly in comparison to the above groove designs, wherein the respective grooves of the corresponding grooves run at an angle of approximately 45° to each other. All groove patterns described previously and shown in FIG. 4 can be produced in simple manner thereby, that a device for example as shown in FIG. 1 is directed multiple times over the particular covered disk 90, however in each subsequent step is respectively rotated about the corresponding above indicated angle.

Figure 5:
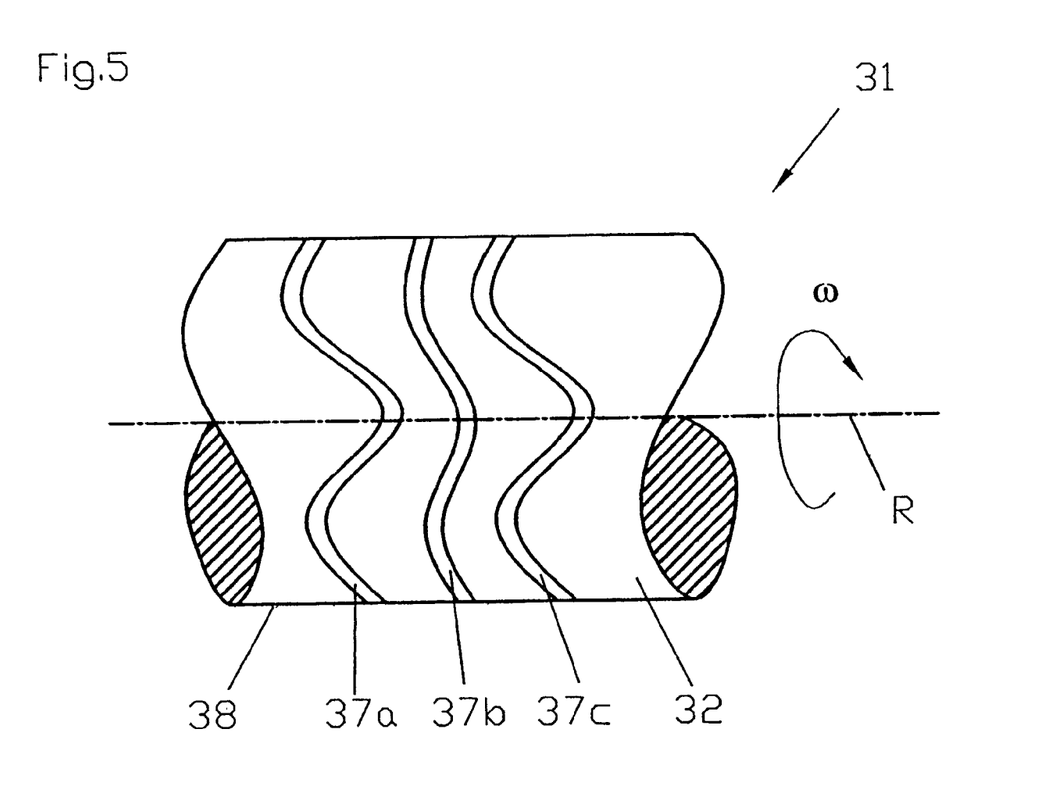

FIG. 5 shows a further illustrative embodiment of an inventive rolling device 31. This rolling device 31 according to FIG. 5 is not formed as in the preceding described illustrative embodiments according to FIGS. 1 through 3 of disk sets with multiple template disks and spacing rings, but rather is comprised of a drum 32 rotatable about a rotation axis R (direction of rotation ω) with a cylindrical shaped circumference surface 38. Upon the circumference surface 38 of the drum 32 are provided, in the present example, three rolling flanges 37a, 37b and 37c which can run curved over the circumference in almost any desired manner. An illustrative embodiment of this type is suitable for introducing other, in particular also non-linear, groove paths or patterns in the friction layer 91 of a covered disk 90.

Figure 6:
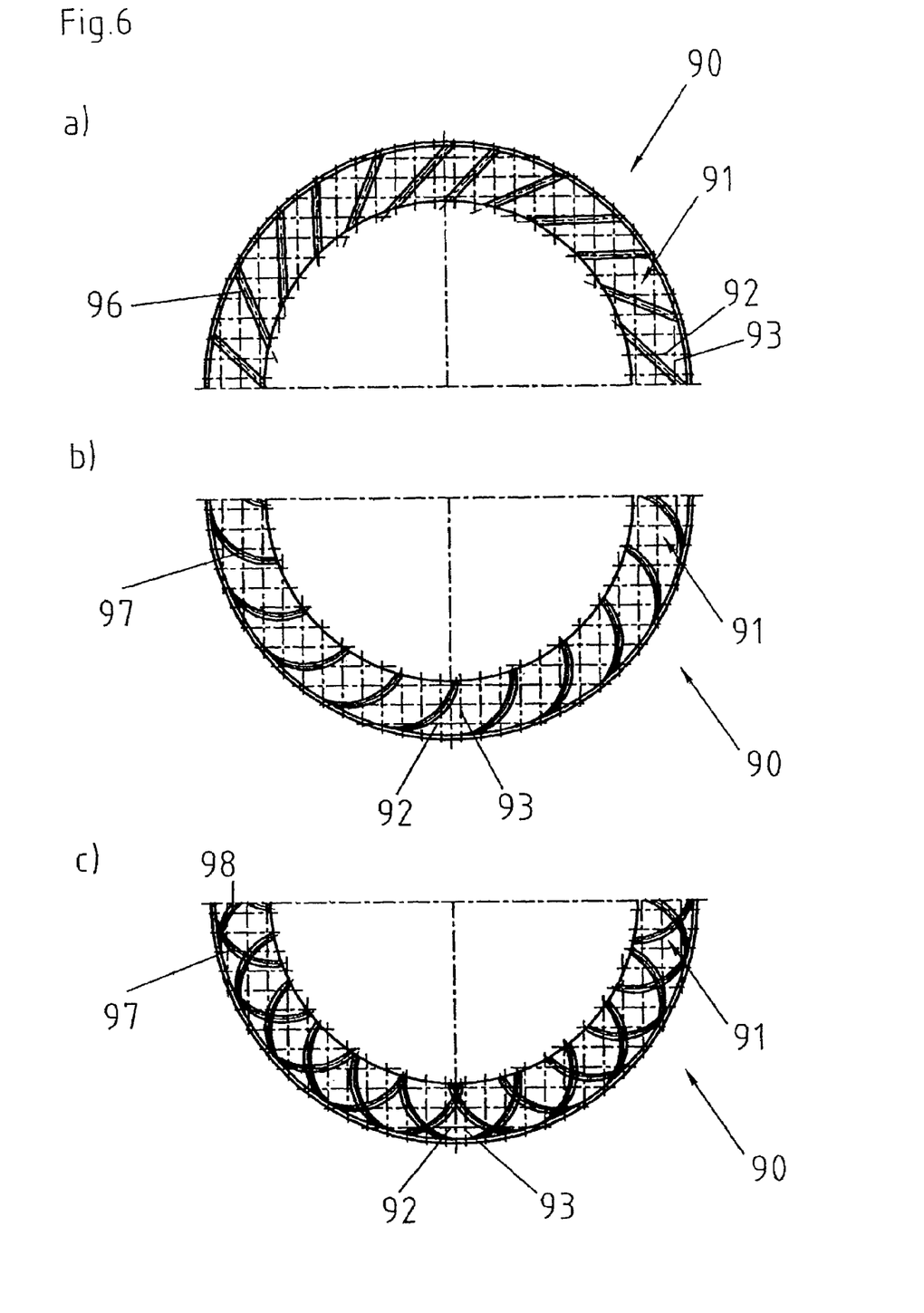
FIG. 6 a top view upon diverse cover layers with grooves for a disk clutch
   groove images of grooves, which can be produced with the aid of a device according to FIG. 5
      a) waffle groove image with grooves arranged with non-concentric ray shape
      b) waffle groove image with ray shaped arranged blade-like curved grooves
      c) waffle groove image with counter-running arranged blade like radiating grooves.

Diverse groove images which can be created using this type of illustrative embodiment can be seen in FIG. 6. Thus, FIG. 6a shows a friction layer with two groups of grooves. The grooves 96 of the first group run along secants, which thus cut into or across the ring shaped covered disk 90. The other group of grooves includes two subgroups. The grooves 92 of the one subgroup run parallel to a radius of the ring shaped disk 90, the grooves 93 of the other subgroup perpendicular thereto. In this manner there is produced a grid. Although the second group of grooves 92, 93 runs linearly, it is comparatively difficult to introduce these grooves with one of the devices according to FIGS. 1 through 3. The device according to FIG. 5 is however particularly suitable therefore.

The groove image according to FIG. 6b) is formed similarly to the groove pattern according to FIG. 6a). Supplemental to the group of grooves 92, 93, which form a grid pattern, there are also provided bow-shaped running grooves. The groove pattern according to FIG. 6c) differs from this essentially thereby, that further bow-shaped grooves 98 are provided, which cut into or across the above-described bow-shaped grooves 97. Both groove patterns according to FIGS. 6b) and c) can be produced by a device according to FIG. 5.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. Process for introduction of at least one groove (92, 93, 94, 95, 96, 97, 98) into a friction layer (91) of a friction disk (90) for a force transmission aggregate, comprising a rolling device (1, 11, 21, 31) forming at least one groove (92, 93, 94, 95, 96, 97, 98), the rolling device (1, 11, 21, 31) having at least one roller flange (7, 17, 27a ... 27f, 37a ... 37c) for roller forming the at least one groove (92, 93, 94, 95, 96, 97, 98), wherein the rolling device (1, 11, 21) includes a drive shaft (4) rotatable (ω) about a rotation axis (R), upon which at least one template disk (2, 12, 22a ... 22f) is provided co-axially, the at least one template disk having an outer circumference (8, 18, 28) which forms the at least one roller flange (7, 17, 27a ... 27f; the at least one groove (92, 93, 94, 95, 96, 97, 98) is roller formed immediately after a step of gluing the friction layer (91) to a carrier material.

* * * * *